(12) United States Patent
Mori et al.

(10) Patent No.: US 6,718,242 B1
(45) Date of Patent: Apr. 6, 2004

(54) VEHICULAR STEERING DEVICE, PROGRAM, AND RECORD MEDIUM

(75) Inventors: Yutaka Mori, Toyohashi (JP); Kazumasa Kodama, Toyota (JP)

(73) Assignee: Toyoda Koki Kabushiki Kaisha, Kariya (JP)

( * ) Notice: Subject to any disclaimer, the term of this patent is extended or adjusted under 35 U.S.C. 154(b) by 0 days.

(21) Appl. No.: 10/346,119

(22) Filed: Jan. 17, 2003

(30) Foreign Application Priority Data

Jan. 17, 2002 (JP) ...................................... 2002-008313

(51) Int. Cl.[7] ................................................ G06F 7/00
(52) U.S. Cl. .......................................... 701/41; 180/443
(58) Field of Search ............................ 701/41, 36, 42, 701/43; 280/89.11; 180/443, 444, 446

(56) References Cited

U.S. PATENT DOCUMENTS 5,828,973 A * 10/1998 Takeuchi et al. .............. 701/41
6,135,233 A * 10/2000 Yamauchi ................... 180/443
6,164,150 A    12/2000 Shindo et al.

FOREIGN PATENT DOCUMENTS

JP           11-34894         2/1999

OTHER PUBLICATIONS

Patent Abstracts of Japan, JP 2001–180509, Jul. 3, 2001.
Patent Abstracts of Japan, JP 07–096804, Apr. 11, 1995.
Patent Abstracts of Japan, JP 2000–351383, Dec. 19, 2000.

* cited by examiner

*Primary Examiner*—Richard M. Camby
(74) *Attorney, Agent, or Firm*—Oblon, Spivak, McClelland, Maier & Neustadt, P.C.

(57) ABSTRACT

A vehicular steering device of the present invention aims at suppressing heat generation. If a voltage is applied to a solenoid, a drive force is generated in a lock arm. If the drive force exceeds an urging force of a torsion coil spring, an electric motor is released and assumes an unlocked state. Accordingly, the drive force that is required for the maintenance of the electric motor in the unlocked state can be smaller than the drive force that is required for switching the electric motor from a locked state to the unlocked state. Thus, after the electric motor has been released in the unlocked state, a voltage is intermittently applied to the solenoid so that the electric motor is held in the unlocked state. In this manner, heat generation from the solenoid is suppressed.

9 Claims, 9 Drawing Sheets

S100 : CONTROL PROCESSING OF ELECTRIC MOTOR

S200 : CONTROL PROCESSING OF ELECTROMAGNETIC COIL

Fig. 8

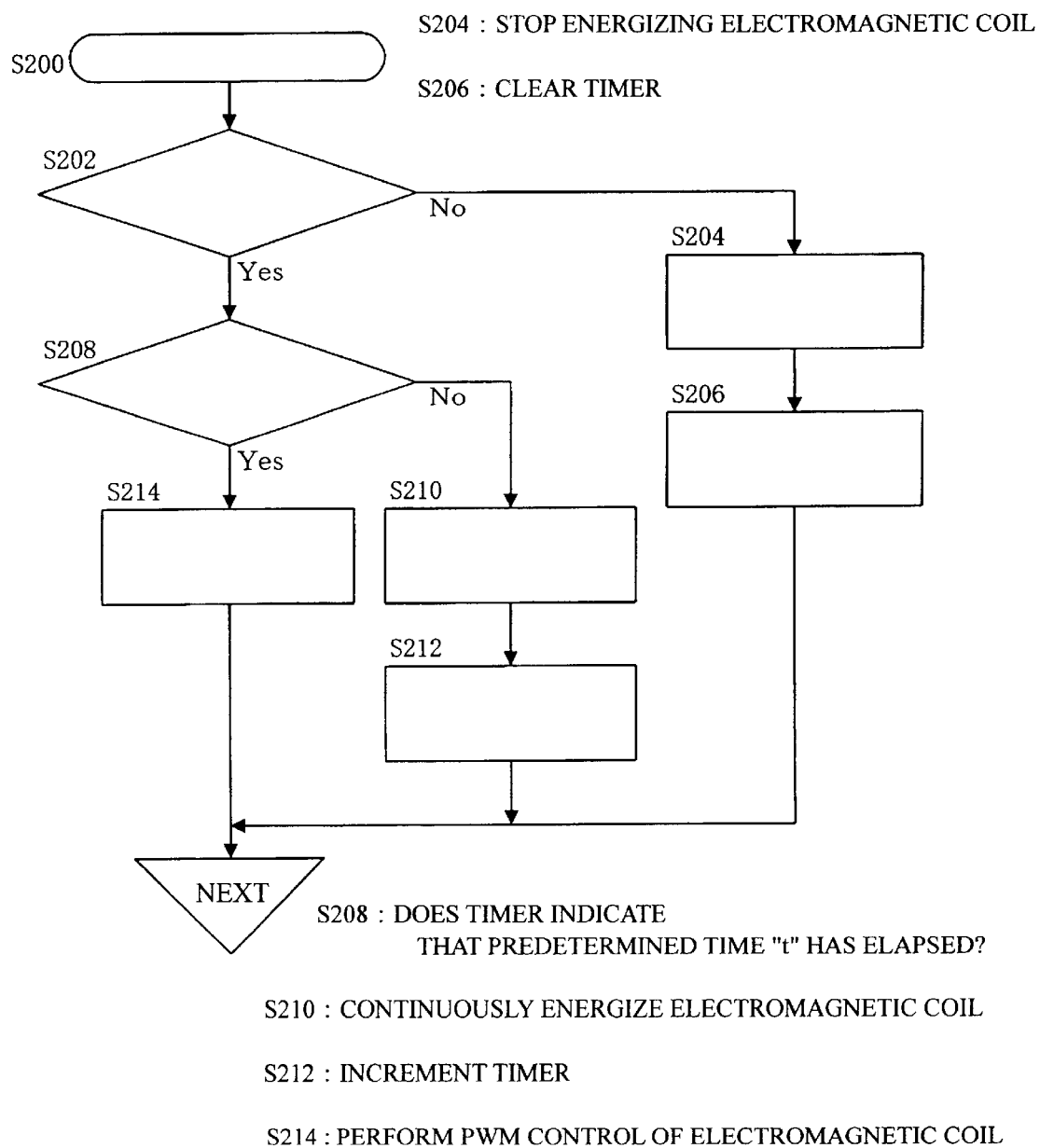

S200 : CONTROL PROCESSING OF ELECTROMAGNETIC COIL

S202 : LOCK CONDITION NOT FULFILLED?,
    ELECTRIC MOTOR TO BE BROUGHT INTO UNLOCKED STATE?

S204 : STOP ENERGIZING ELECTROMAGNETIC COIL

S206 : CLEAR TIMER

S208 : DOES TIMER INDICATE
    THAT PREDETERMINED TIME "t" HAS ELAPSED?

S210 : CONTINUOUSLY ENERGIZE ELECTROMAGNETIC COIL

S212 : INCREMENT TIMER

S214 : PERFORM PWM CONTROL OF ELECTROMAGNETIC COIL

VEHICULAR STEERING DEVICE, PROGRAM, AND RECORD MEDIUM

INCORPORATION BY REFERENCE

The disclosure of Japanese Patent Application No. 2002-008313 filed on Jan. 17, 2002, including its specification, drawings, and abstract, is incorporated herein by reference in its entirety.

BACKGROUND OF THE INVENTION

1. Field of the Invention

The present invention relates to a vehicular steering device, a program, and a record medium. More particularly, the present invention relates to a vehicular steering device capable of changing a transfer ratio between a steering angle of a steering handle and a turning angle of a turning wheel, a program for causing a computer system to function so as to realize the vehicular steering device, and a computer-readable record medium in which the program is recorded.

2. Description of the Related Art

According to the art related to the present invention, various vehicular steering devices comprising a variable transfer-ratio unit for changing a transfer ratio between a steering angle of a steering handle and a turning angle of a turning wheel and an electric motor for driving the variable transfer-ratio unit have been proposed. These vehicular steering devices have a lock unit for stopping relative rotation of the electric motor.

The lock unit directly connects the steering handle and the turning wheel by stopping the relative rotation of the electric motor in the case of a failure in the electric motor or an electric motor driving circuit, or in some other cases.

The lock unit is composed of a stopper member for stopping relative rotation of the electric motor and a solenoid for driving the stopper member. If an electromagnetic coil constituting the solenoid is energized, the stopper member is driven and the electric motor is released.

In the lock unit of the related art, the electromagnetic coil constituting the solenoid is continuously energized without being interrupted while the electric motor is being released. Hence, the electromagnetic coil generates heat. If a long period is required to release the electric motor, the electromagnetic coil is sometimes heated up, for example, to a temperature of approximately 200° C.

The vehicular steering devices of the related art have an operating angle sensor for detecting an operating angle of the electric motor. A transfer ratio between a steering angle of the steering handle and a turning angle of the turning wheel is set on the basis of the operating angle.

In the case where the operating angle sensor is embodied using a semiconductor device such as a Hall IC which exhibits a low heat resistance, if the temperature of the electromagnetic coil rises, there is an apprehension that heat generated therefrom will lead to a malfunction in the operating angle sensor or a reduction in life of the operating angle sensor.

Further, in the case where various semiconductor devices (e.g., an anti-noise capacitor and a non-return diode connected to a drive signal feed line leading to the electric motor, and the like) as well as the operating angle sensor are disposed close to the electromagnetic coil, if the temperature of the electromagnetic coil rises, there is an apprehension that heat generated therefrom will lead to a malfunction in the semiconductor devices or a reduction in life of the semiconductor devices.

SUMMARY OF THE INVENTION

The present invention has been made as a solution to the above-mentioned problems.

It is an object of the present invention to provide a vehicular steering device capable of suppressing heat generation.

It is another object of the present invention to provide a program for causing a computer system to function so as to realize the vehicular steering device.

It is still another object of the present invention to provide a computer-readable record medium in which a program for causing a computer system to function so as to realize the vehicular steering device is recorded.

A vehicular steering device in accordance with a first aspect of the present invention comprises a variable transfer-ratio unit for changing a transfer ratio between a steering angle of a steering handle and a turning angle of a turning wheel, an electric motor for driving the variable transfer-ratio unit, and a lock unit for switching between a locked state in which relative rotation of the electric motor is stopped and an unlocked state in which the electric motor is released. The lock unit comprises a stopper member for stopping relative rotation of the electric motor, an urging member for urging the stopper member such that the stopper member stops the electric motor, a solenoid for releasing the electric motor by driving the stopper member against an urging force of the urging member, and a control unit for controlling a voltage applied to the solenoid. After the electric motor has been released and has assumed the unlocked state, the control unit intermittently applies a voltage to the solenoid so as to maintain the electric motor in the unlocked state.

If a voltage is applied to the solenoid, a drive force is generated in the stopper member. If the drive force exceeds an urging force of the urging member, the electric motor is released and assumes the unlocked state. Accordingly, the drive force that is required for the maintenance of the electric motor in the unlocked state can be smaller than the drive force that is required for a shift of the electric motor from the locked state to the unlocked state.

Thus, as in the first aspect of the present invention, if a voltage is intermittently applied to the solenoid so as to maintain the electric motor in the unlocked state after the electric motor has been released and assumed the unlocked state, heat generation from the solenoid can be suppressed.

That is, heat that is generated while the voltage is applied to the solenoid is discharged while no voltage is applied to the solenoid. Therefore, heat generation can be suppressed more effectively in comparison with a case where a voltage is continuously applied to the solenoid as in the related art.

The vehicular steering device in accordance with the first aspect of the present invention may be structured such that, when switching from the locked state to the unlocked state, the control unit continuously applies a voltage to the solenoid until the electric motor is released.

Thus, according to the above-mentioned structure, the electric motor can be released without delay and brought into the unlocked state.

The vehicular steering device in accordance with the first aspect of the present invention may be structured such that the control unit changes, in coordination with a power-supply voltage applied to the solenoid, a duty ratio at which the voltage is intermittently applied to the solenoid.

If a voltage is applied to the solenoid, a drive force is generated in the stopper member. The drive force increases in proportion to an increase in the power-supply voltage, whereas the urging force of the urging member is constant. In order to maintain the electric motor in the unlocked state, it is appropriate that the drive force be equal to or larger than the urging force. Therefore, if the power-supply voltage is high, it is appropriate that the duty ratio at which the voltage is intermittently applied to the solenoid be set as a small value.

Thus, according to the above-mentioned structure, by performing duty control through application of the voltage to the solenoid at the duty ratio corresponding to the power-supply voltage, it becomes possible to prevent the drive force from becoming excessive in the case where the power-supply voltage is high, and to inhibit the solenoid from generating heat whose amount corresponds to an excess in the drive force.

The vehicular steering device in accordance with the first aspect of the present invention may be structured such that the control unit changes the duty ratio in a stepped manner in coordination with the power-supply voltage.

The vehicular steering device in accordance with the first aspect of the present invention may be structured such that, when the duty ratio is changed in the stepped manner, the control unit ensures that the duty ratio exhibits a hysteresis characteristic corresponding to the power-supply voltage.

If the solenoid causes the phenomenon of chattering during a change in application state of a voltage to the solenoid, the stopper member repeats its movements several times and then stabilizes. Thus, there is an apprehension that the electric motor will shift from the unlocked state to the locked state.

Thus, as in the above-mentioned structure, by ensuring that the duty ratio exhibits the hysteresis characteristic corresponding to the power-supply voltage, it becomes possible to prevent the solenoid from causing the phenomenon of chattering as a result of fluctuations in the power-supply voltage, and to stably maintain the electric motor in the unlocked state even during fluctuations in the power-supply voltage.

The vehicular steering device in accordance with the first aspect of the present invention may be structured such that the control unit continuously changes the duty ratio in coordination with the power-supply voltage.

The vehicular steering device in accordance with the aspect of the present invention may be structured such that the control unit linearly changes the duty ratio in coordination with the power-supply voltage.

A program in accordance with a second aspect of the present invention causes a computer system to function as each of the units in the above-mentioned vehicular steering device.

That is, a function for realizing each of the units in the above-mentioned vehicular steering device can be provided as a program to be performed by a computer system.

In a computer-readable record medium in accordance with a third aspect of the present invention, a program for causing a computer system to function as each of the units in the above-mentioned vehicular steering device is recorded.

In the case of such a program, the program may be recorded in the computer-readable record medium, for example, a ROM or a backup RAM, and the ROM or the backup RAM may be used in combination with the computer system.

In addition, the above-mentioned program may be recorded in a computer-readable record medium such as a semiconductor memory (smart medium, memory stick, or the like), a hard disk, a floppy disk, a data card (IC card, magnetic card, or the like), an optical disk (CD-ROM, CD-R, CD-RW, DVD, or the like), a magneto-optical disk (MO or the like), a phase-change disk, a magnetic tape, or the like, and that the program be started and used, if necessary, by being loaded into the computer system.

BRIEF DESCRIPTION OF THE DRAWINGS

FIG. 6 is a flowchart showing the flow of main processing performed by a CPU 44a.

FIG. 8 is a flowchart showing processing performed by the CPU 44a to control an electromagnetic coil 96.

DETAILED DESCRIPTION OF THE PREFERRED EMBODIMENTS

Hereinafter, embodiments as concrete forms of the present invention will be described with reference to the drawings.

Figure 1:
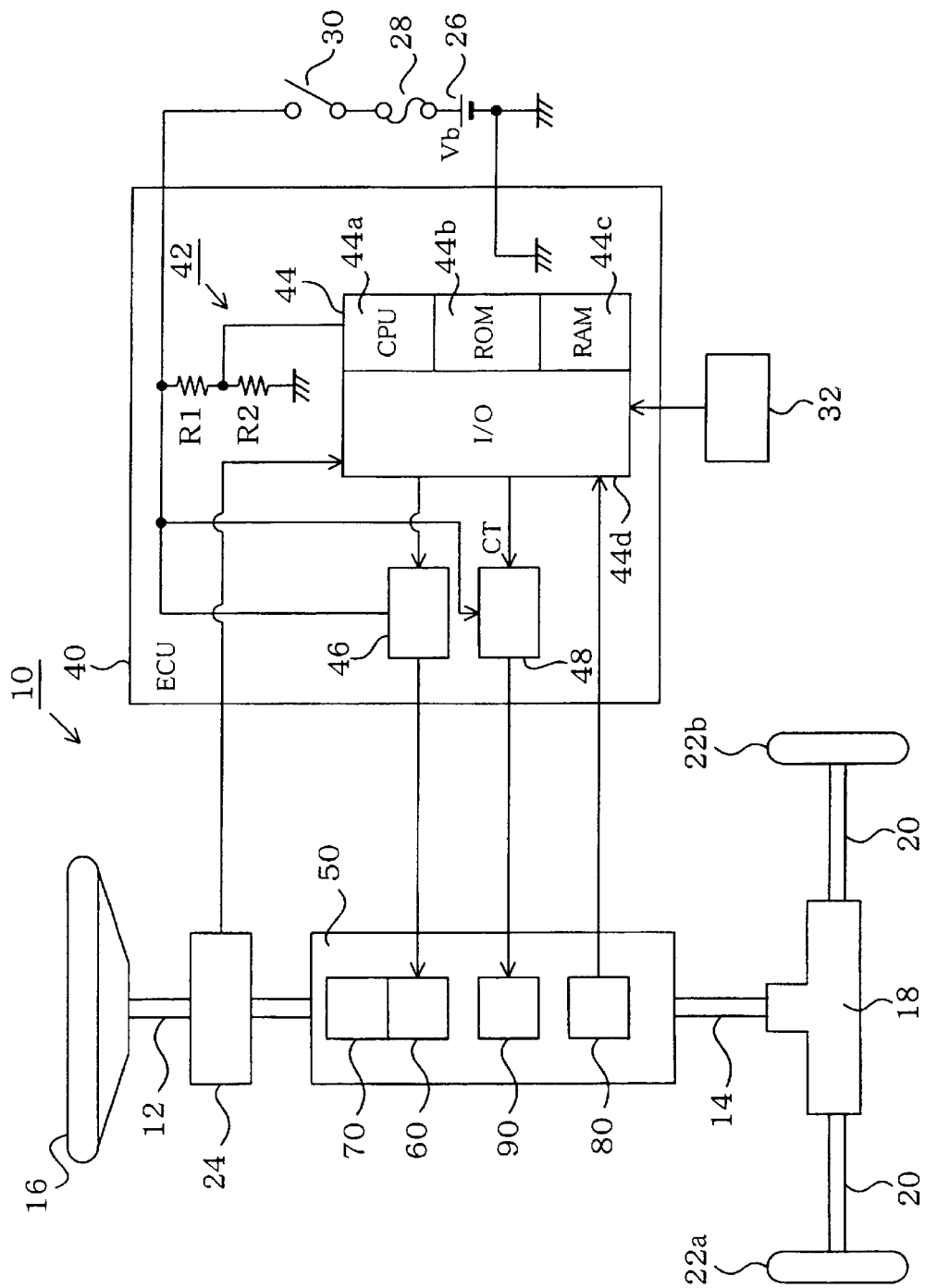
FIG. 1 is a block diagram showing the overall structure of a vehicular steering device 10 in accordance with one embodiment as a concrete form of the present invention.

FIG. 1 is the block diagram showing the overall structure of the vehicular steering device 10 in accordance with one embodiment of the present invention.

The vehicular steering device 10 is composed of an input shaft 12, an output shaft 14, a steering handle 16, a steering mechanism 18, a steering rod 20, turning wheels 22a, 22b, a steering angle sensor 24, an on-vehicle battery 26, a fuse 28, an ignition switch 30, a vehicle speed sensor 32, an electronic control unit (ECU) 40, a variable transfer-ratio mechanism 50, and the like.

The input shaft 12 and the output shaft 14 constitute a steering shaft and are coupled to each other via the variable transfer-ratio mechanism 50. The input shaft 12 is coupled to the steering handle 16 of a vehicle. The output shaft 14 is coupled to the steering mechanism 18.

The steering mechanism (steering gearbox) 18 is constructed of a rack-and-pinion gear device and converts rotational movements of the output shaft 14 into axial movements of the steering rod 20.

The left turning wheel 22a is coupled to a left end of the steering rod 20. The right turning wheel 22b is coupled to a right end of the steering rod 20.

The steering angle sensor 24 for detecting a rotational angle of the input shaft 12 is disposed thereon. Because a rotational angle of the input shaft 12 corresponds to a steering angle of the steering handle 16, the steering angle sensor 24 detects a steering angle of the steering handle 16 by detecting a rotational angle of the input shaft 12.

The steering angle sensor 24 is constructed of a rotary encoder that detects a relative rotational angle. A detection signal output from the rotary encoder is delivered to the ECU 40.

A direct-current voltage of the on-vehicle battery 26 (a battery voltage Vb) installed in the vehicle is applied to the ECU 40 via the fuse 28 and the ignition switch 30 that has been turned on.

The vehicle speed sensor 32 detects a vehicle speed from rotational speeds of wheels of the vehicle or the like. A detection signal from the vehicle speed sensor 32 is delivered to the ECU 40.

The variable transfer-ratio mechanism (variable gear-ratio unit) 50 is provided with an electric motor 60, a speed reducer 70, operating angle sensors 80, and a lock mechanism 90.

The variable transfer-ratio mechanism 50 relatively rotatably couples the input shaft 12 and the output shaft 14 to each other. By driving and displacing the speed reducer 70 by means of the electric motor 60, the variable transfer-ratio mechanism 50 changes a transfer ratio between a rotational amount of the input shaft 12 and a rotational amount of the output shaft 14 (i.e., a transfer ratio between a steering angle of the steering handle 16 and a turning angle of each of the turning wheels 22*a*, 22*b*).

The operating angle sensors 80 detect an operating angle of the electric motor 60. Detection signals from the operating angle sensors 80 are delivered to the ECU 40.

The ECU 40 is composed of a voltage-dividing circuit 42, a microcomputer 44, a motor drive circuit 46, and the coil drive circuit 48.

The voltage-dividing circuit 42 is composed of resistances R1, R2, divides the battery voltage Vb that has been applied from the on-vehicle battery 26 via the fuse 28 and the ignition switch 30 by a resistance value ratio between the resistances R1, R2, and applies divided voltages to the microcomputer 44.

The microcomputer 44 is composed of the CPU 44*a*, a ROM 44*b*, a RAM 44*c*, an I/O circuit 44*d*, and the like.

Detection signals from the vehicle speed sensor 32 and the operating angle sensors 80 are input to the CPU 44*a* via the I/O circuit 44*d*. Through various calculation processing that is performed by a computer according to a computer program recorded in the ROM 44*b*, the CPU 44*a* controls the motor drive circuit 46 on the basis of the detection signals. Also, the CPU 44*a* generates a control signal CT for controlling the coil drive circuit 48. The control signal CT generated by the CPU 44*a* is output to the coil drive circuit 48 via the I/O circuit 44*d*.

The motor drive circuit 46 is provided with a PWM (Pulse Width Modulation) control circuit. According to control of the microcomputer 44, the motor drive circuit 46 performs PWM control and thus generates a drive current for driving the electric motor 60 from a direct-current voltage that has been applied from the battery 26 via the fuse 28 and the ignition switch 30. The motor drive circuit 46 outputs the drive current to the electric motor 60 and controls rotation thereof.

According to the control signal CT output from the microcomputer 44, the coil drive circuit 48 controls the electromagnetic coil in the lock mechanism 90 as will be described later.

[Structure of Variable Transfer-Ratio Mechanism]

Figure 2:
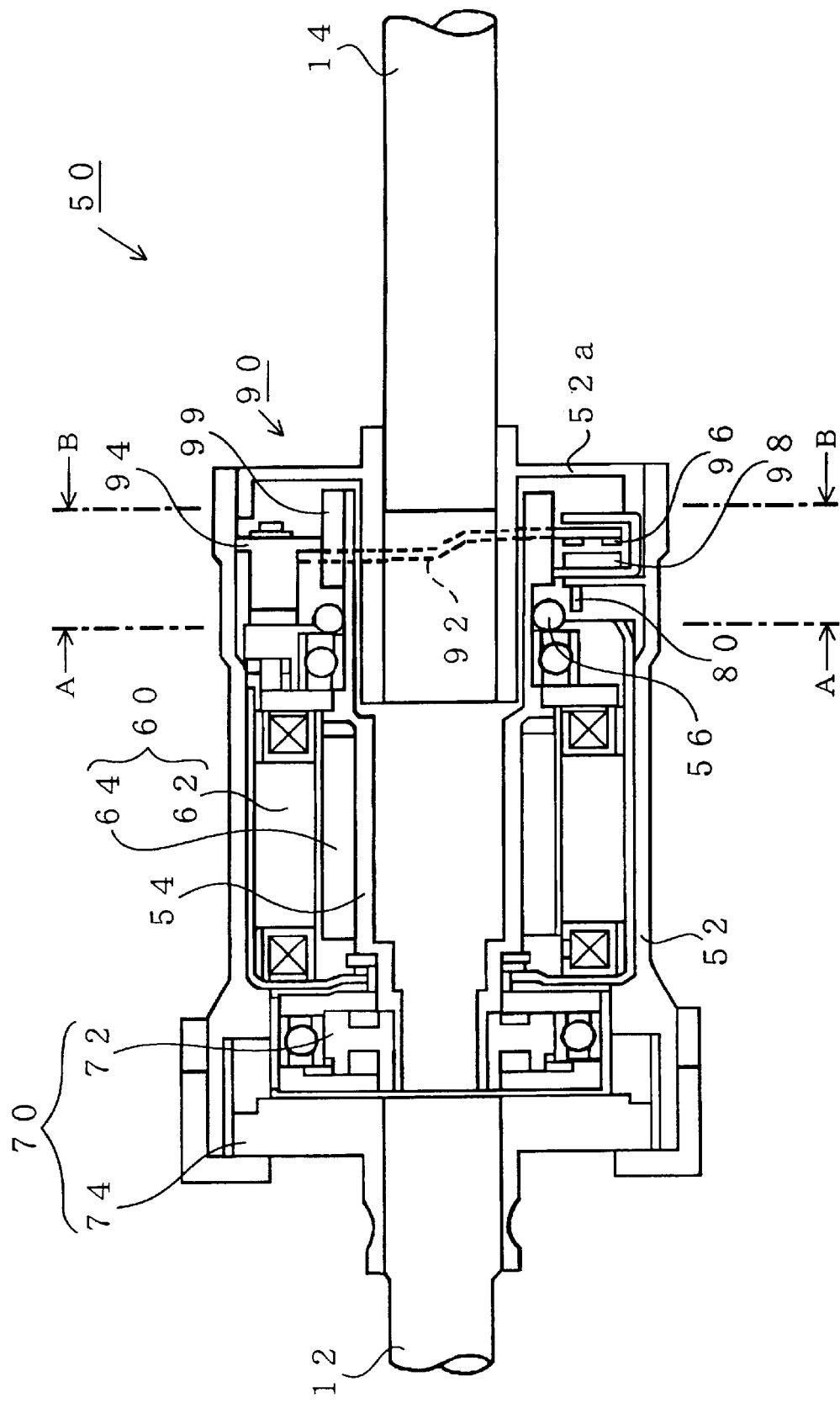
FIG. 2 is a cross-sectional view showing the structure of a variable transfer-ratio mechanism 50.

FIG. 2 is the cross-sectional view showing the structure of the variable transfer-ratio mechanism 50.

The variable transfer-ratio mechanism 50 is provided with a generally cylindrical housing 52. A cover 52*a* is disposed on one side of the housing 52.

The electric motor 60 is disposed in the housing 52. The electric motor 60 is composed of a stator 62 and a rotor 64.

The cylindrical stator 62 is fixed in the housing 52, and the cylindrical rotor 64 is disposed inside the stator 62. The electric motor 60 is constructed, for example, of a three-phase brushless motor with two magnetic poles.

The speed reducer 70 is constructed of a wave-gear speed reducer that is provided with an elliptical cam 72 and a movable flange 74.

A central portion of a hollow shaft 54 is securely fitted in the rotor 64. A tip portion of the hollow shaft 54 is securely fitted in a central hole of the elliptical cam 72 of the speed reducer 70.

A central hole of the movable flange 74 is securely fitted on the input shaft 12.

A central portion of the cover 52*a* of the housing 52 is extended into the hollow shaft 54. A central hole formed in the central portion of the cover 52*a* is securely fitted on the output shaft 14.

Thus, if the electric motor 60 rotationally drives the elliptical cam 72, the movable flange 74 is rotated relative to the housing 52. As a result, the input shaft 12 and the output shaft 14 are rotated relative to each other.

[Structure of Operating Angle Sensors]

Figure 3:
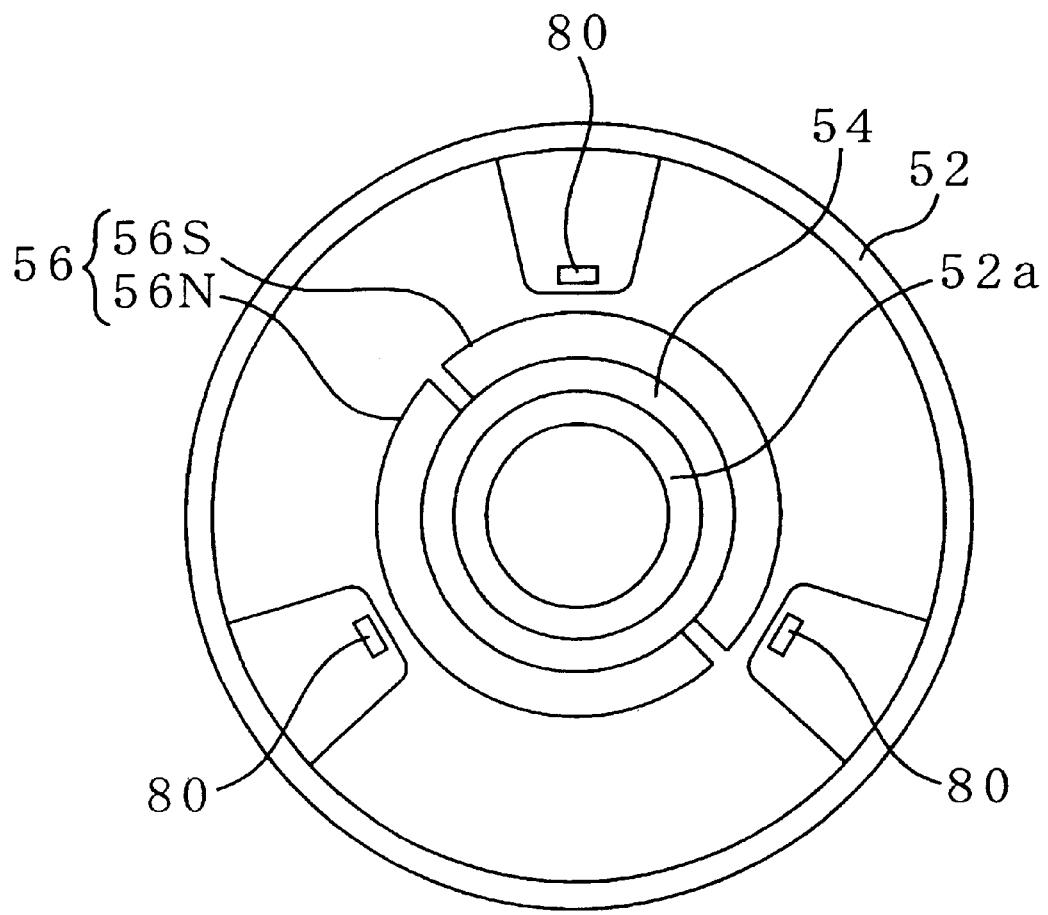
FIG. 3 is a cross-sectional view taken along a line A—A in FIG. 2.

FIG. 3 is the cross-sectional view taken along the line A—A in FIG. 2.

A ring-like permanent magnet 56 is securely fitted on an outer periphery of a base end portion of the hollow shaft 54. The permanent magnet 56 is divided into two semicircular poles, that is, an N pole 56N and an S pole 56S.

The three operating angle sensors 80 are arranged at equal angular intervals of 120° and are securely mounted opposite the permanent magnet 56 in the housing 52.

The operating angle sensors 80 are constructed of Hall IC's. An operating angle of the electric motor 60 is detected by detecting changes in polarity of the permanent magnet 56 by means of the Hall IC's.

[Structure of Lock Mechanism]

Figure 4:
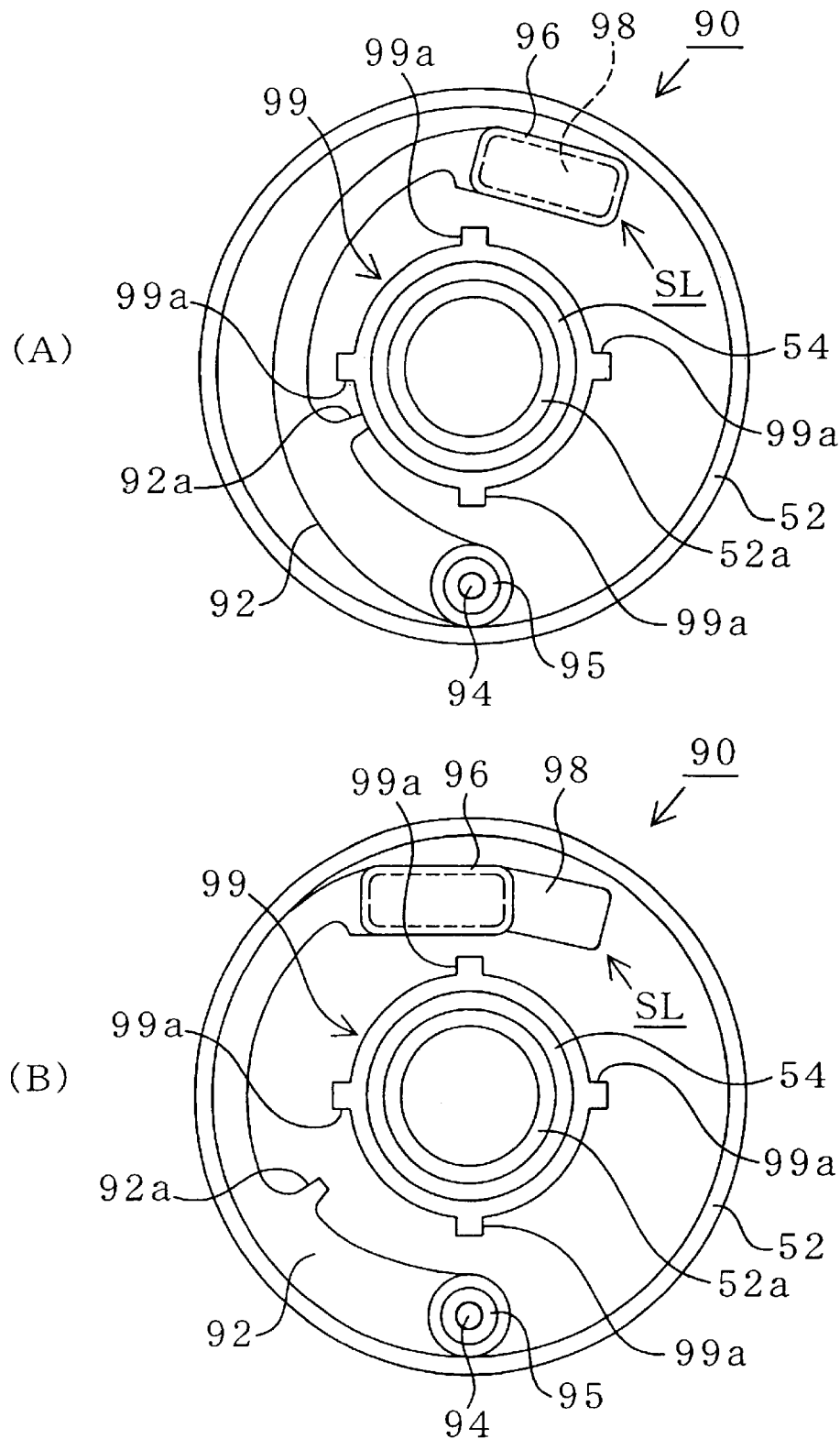
FIG. 4 is a cross-sectional view taken along a line B—B in FIG. 2.

FIG. 4 is the cross-sectional view taken along the line B—B in FIG. 2.

The lock mechanism 90 is composed of a lock arm 92, a support shaft 94, a torsion coil spring 95, the electromagnetic coil (lock coil) 96, a permanent magnet 98, and a lock holder 99.

The lock arm 92 is curved in a circular shape that corresponds to the shape of an inner periphery of the housing 52.

A base end portion of the lock arm 92 is turnably mounted to the support shaft 94 that is securely mounted in the housing 52.

The torsion coil spring 95 is inserted through the support shaft 94. The torsion coil spring 95 has first and second end portions. The first end portion is securely mounted to the base end portion of the lock arm 92. The second end portion is securely mounted to the housing 52.

An engaging convex portion 92*a* protrudes from a substantially central portion of the lock arm 92. The electromagnetic coil 96 is securely mounted to a tip portion of the lock arm 92.

The permanent magnet 98 is securely mounted in the housing 52 at a position corresponding to the electromagnetic coil 96.

The generally ring-like lock holder 99 is securely fitted on the base end portion of the hollow shaft 54. Four engaging convex portions 99*a* are formed on an outer periphery of the lock holder 99 at equal angular intervals of 90°.

Next, operation of the lock mechanism 90 thus constructed will be described.

The lock arm 92 is always pressed and urged toward the lock holder 99 by the torsion coil spring 95.

Thus, if the electromagnetic coil 96 is not energized, the lock arm 92 tilts toward the lock holder 99, and the engaging convex portion 92a of the lock arm 92 abuts on and engages with one of the engaging convex portions 99a of the lock holder 99 as shown in FIG. 4(A).

Then, the lock arm 92 secures the lock holder 99 through engagement, and the hollow shaft 54 on which the lock holder 99 is securely fitted is secured through engagement to the housing 52 to which the lock arm 92 is mounted.

As a result, the stator 62 securely mounted to the housing 52 and the rotor 64 securely fitted on the hollow shaft 54 are prevented from rotating relative to each other. Therefore, relative rotation of the electric motor 60 is prevented as well (this state will be referred to hereinafter as "a locked state of the electric motor 60"). Thus, the steering handle 16 and each of the turning wheels 22a, 22b are directly coupled to each other.

If the electromagnetic coil 96 is then energized, a drive force (repulsive force) resulting from an electromagnetic force is generated between the electromagnetic coil 96 and the permanent magnet 98.

If the drive force exceeds a pressing/urging force of the torsion coil spring 95, the lock arm 92 tilts in such a direction as to move away from the lock holder 99 (toward the housing 52), and the engaging convex portion 92a of the lock arm 92 and the engaging convex portion 99a of the lock holder 99 are disengaged from each other as shown in FIG. 4(B).

As a result, relative rotation of the stator 62 and the rotor 64 is permitted, and relative rotation of the electric motor 60 is permitted as well. Therefore, the electric motor 60 becomes rotatable (this state will be referred to hereinafter as "an unlocked state of the electric motor 60").

If the electromagnetic coil 96 is stopped from being energized, the drive force resulting from the electromagnetic force between the electromagnetic coil 96 and the permanent magnet 98 disappears. Therefore, the electric motor 60 reassumes the state shown in FIG. 4(A) (the locked state of the electric motor 60) due to a pressing/urging force of the torsion coil spring 95.

That is, the lock arm 92, the electromagnetic coil 96, and the permanent magnet 98 in the lock mechanism 90 constitute a solenoid SL, and the lock arm 92 corresponds to a plunger of the solenoid SL.

[Structure of Coil Drive Circuit]

Figure 5:
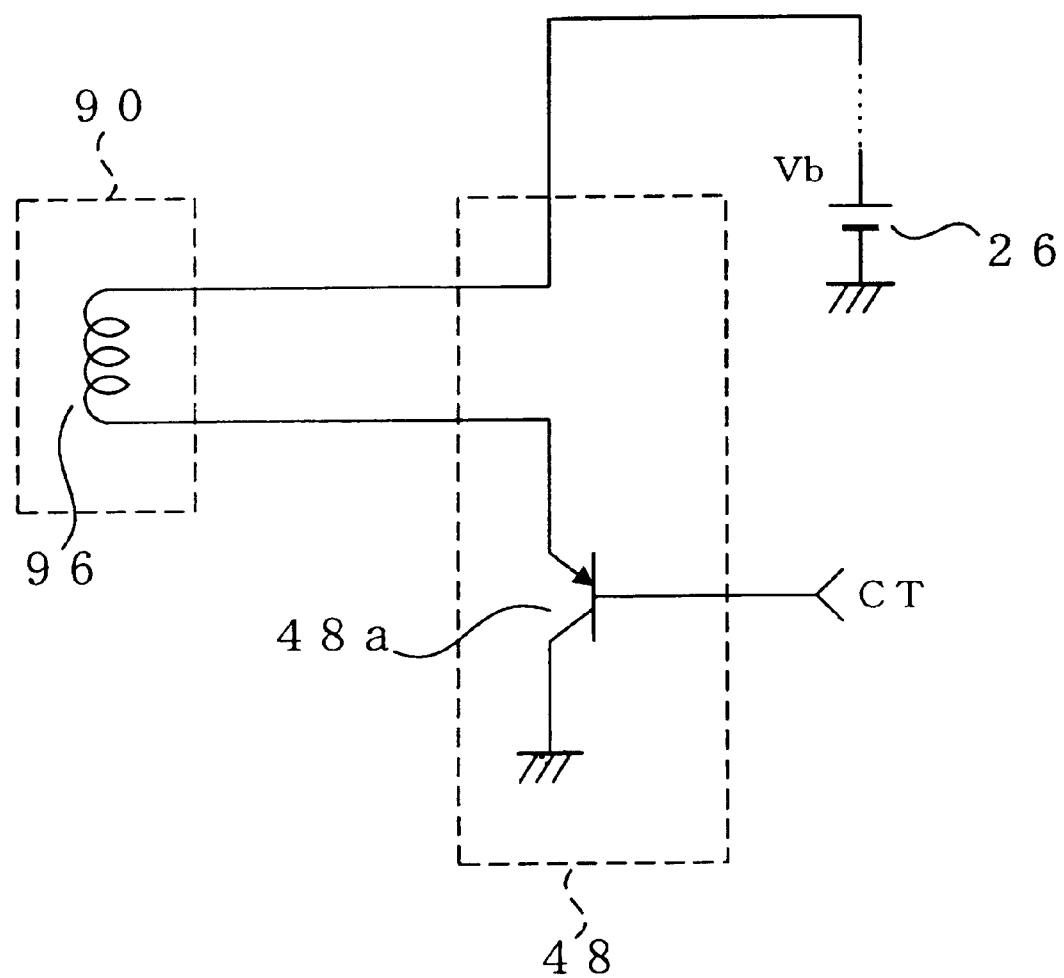
FIG. 5 is a circuit diagram showing the structure of a coil drive circuit 48.

FIG. 5 is the circuit diagram showing the structure of the coil drive circuit 48.

The coil drive circuit 48 is provided with a PNP transistor 48a.

An emitter of the transistor 48a is connected to the on-vehicle battery 26 on its plus side via the electromagnetic coil 96 of the lock mechanism 90. A collector of the transistor 48a is grounded and is connected to the on-vehicle battery 26 on its minus side. The control signal CT output from the microcomputer 44 is input to a base of the transistor 48a.

Thus, if the transistor 48a is turned on in response to the control signal CT, a direct-current voltage is applied from the on-vehicle battery 26, the battery voltage Vb is applied, and the electromagnetic coil 96 is energized. If the transistor 48a is turned off in response to the control signal CT, the direct-current voltage is stopped from being applied from the on-vehicle battery 26, and the electromagnetic coil 96 is stopped from being energized as well.

[Operation of Vehicular Steering Device]

Figure 6:
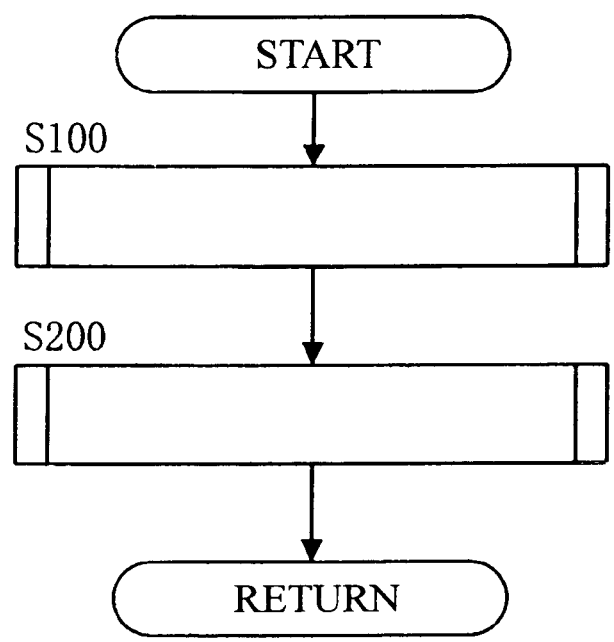
Figure 7:
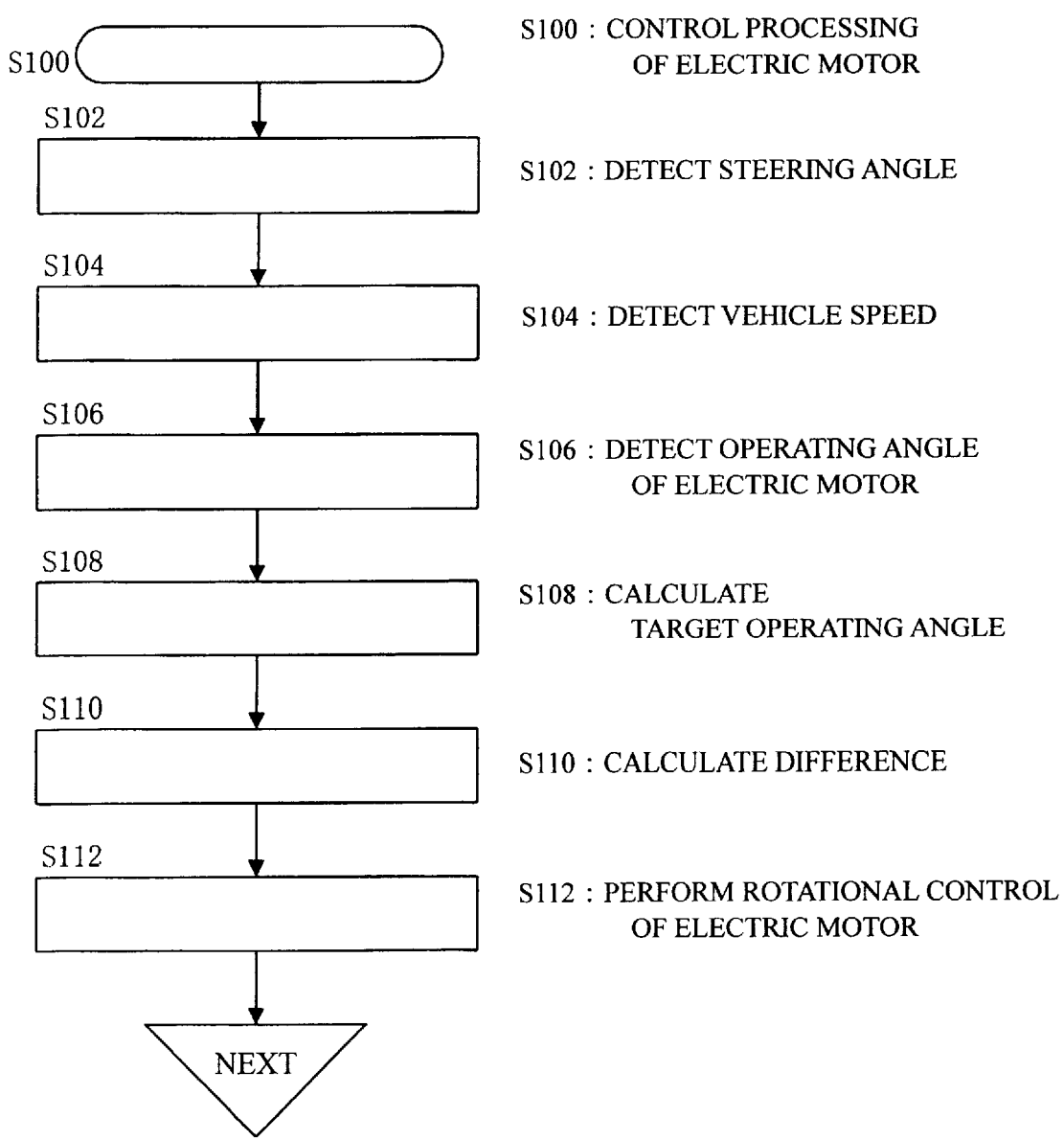
FIG. 7 is a flowchart showing processing performed by the CPU 44a to control an electric motor.

FIGS. 6 to 8 are the flowcharts showing the flow of the main processing performed by the CPU 44a.

Through the calculation processing that is performed by the computer according to the computer program recorded in the ROM 44b, the CPU 44a performs processing in the following steps (hereinafter referred to as "S").

The above-mentioned program may be recorded in an outboard recorder (external memory) that is provided with a computer-readable record medium (a semiconductor memory (smart medium, memory stick, or the like), a hard disk, a floppy disk, a data card (IC card, magnetic card, or the like), an optical disk (CD-ROM, CD-R, CD-RW, DVD, or the like), a magneto-optical disk (MO or the like), a phase-change disk, a magnetic tape, or the like), and that the program be started and used, if necessary, by being loaded into the CPU 44a from the outboard recorder.

The CPU 44a sequentially and repeatedly performs the control processing of the electric motor 60 (S100) and the control processing of the magnetic coil 96 (S200).

[Control Processing of Electric Motor 60]

FIG. 7 is the flowchart showing the flow of the control processing performed by the electric motor 60.

In the control processing (S100) of the electric motor 60, a detection signal from the steering angle sensor 24 is first input to the CPU 44a via the I/O circuit 44d. The CPU 44a detects a rotational direction of the steering handle 16 on the basis of a phase difference of the detection signal, detects a relative rotational angle of the steering handle 16 by counting how many pulses there are in the detection signal, and detects a steering angle θh on the basis of the rotational direction and the relative rotational angle of the steering handle 16 (S102).

Next, a detection signal from the vehicle speed sensor 32 is input to the CPU 44a via the I/O circuit 44d, and the CPU 44a detects a vehicle speed on the basis of the detection signal (S104)

Then, a detection signal from the operating angle sensor 80 is input to the CPU 44a via the I/O circuit 44d, and the CPU 44a detects an operating angle θm of the electric motor 60 on the basis of the detection signal (S106).

Next, the CPU 44a calculates a target operating angle θmm of the electric motor 60 on the basis of the vehicle speed and the steering,angle θh of the steering handle 16 (S108).

Then, the CPU 44a subtracts the operating angle θm from the target operating angle θmm of the electric motor 60 and calculates a difference "e" (=θmm−θm) (S110).

The CPU 44a causes the motor drive circuit 46 to control rotation of the electric motor 60 by controlling the motor drive circuit 46 such that the difference "e" becomes equal to 0, and thereby performs control such that a rotational angle (output angle) θp of the output shaft 14 assumes a desired value (S112).

If it is assumed that K represents a speed reduction ratio of the speed reducer 70, an equation shown below is established:

$$\theta p = \theta h + K \cdot \theta m$$

The rotational angle θp of the output shaft 14 corresponds to a stroke position of the steering rod 20, and the stroke position corresponds to a turning angle of each of the turning wheels 22a, 22b. Therefore, the rotational angle θp corresponds to the turning angle of each of the turning wheels 22a, 22b.

Thus, the variable transfer-ratio mechanism 50 that relatively rotatably couples the input shaft 12 and the output shaft 14 to each other changes a transfer ratio between a rotational amount of the input shaft 12 and a rotational amount of the output shaft 14 by driving and displacing the speed reducer 70 by means of the electric motor 60, and changes a transfer ratio between the steering angle θh of the steering handle 16 and the turning angle of each of the turning wheels 22a, 22b.

[Control Processing of Electromagnetic Coil 96]

FIG. 8 is the flowchart showing the flow of the control processing of the electromagnetic coil 96.

In the control processing (S200) of the electromagnetic coil 96, the CPU 44a first determines whether to bring the electric motor 60 into the unlocked state by determining whether or not a lock condition for bringing the electric motor into the locked state has been fulfilled (S202).

It is to be noted herein that the lock condition includes the occurrence of a malfunction in the vehicular steering device 10.

For example, the malfunction in the vehicular steering device 10 includes the following cases (1) to (3):

(1) a failure in the electric motor 60 or the motor drive circuit 46;

(2) a failure in the sensors 24, 32, 80, such as a case where correct detection signals cannot be obtained therefrom; and (3) a failure in wiring such as braking or short-circuiting of a cable or a terminal for connecting the ECU 40 and the variable transfer-ratio mechanism 50 to each other.

If the above-mentioned lock condition has not been fulfilled and if the electric motor 60 is not brought into the unlocked state (S202: No), the CPU 44a generates a low-level control signal CT for continuously holding the transistor 48a of the coil drive circuit 48 OFF, and outputs the control signal CT to the coil drive circuit 48 via the I/O circuit 44d (S204).

Then, the CPU 44a clears a timer that will be described later (S206), and proceeds to the control processing (S100) of the electric motor 60 afterwards.

Then, the transistor 48a of the coil drive circuit 48 is continuously held OFF according to the low-level control signal CT (duty ratio: 0%), and the electromagnetic coil 96 is continuously stopped from being energized. As a result, the electric motor 60 assumes the locked state as shown in FIG. 4(A).

If the above-mentioned lock condition has not been fulfilled and if the electric motor 60 is brought into the unlocked state (S202: Yes), the CPU 44a determines on the basis of a time measured by the timer whether or not a predetermined time "t" has elapsed (S208). If the predetermined time "t" has not elapsed (S208: No), the CPU 44a generates a high-level control signal CT for continuously holding the transistor 48a of the coil drive circuit 48 ON and outputs the control signal CT to the coil drive circuit 48 via the I/O circuit 44d (S210).

Then, the CPU 44a increments the timer (S212) and proceeds to the control processing (S100) of the electric motor 60 afterwards. The timer may be embodied by a software timer based on the CPU 44a, otherwise a dedicated timer circuit may be provided in the ECU 40.

Figure 9:
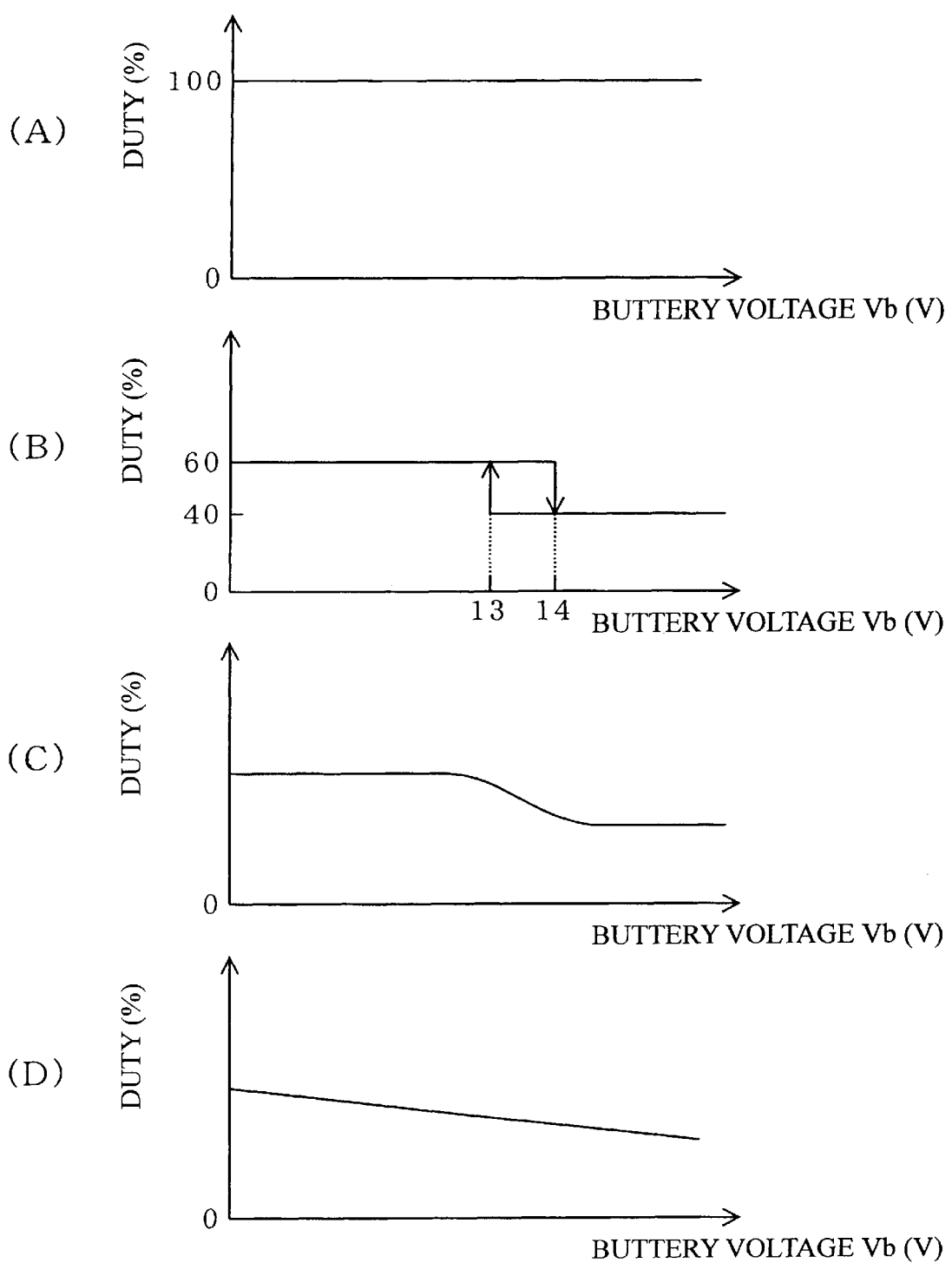
FIG. 9 is a characteristic diagram for explaining duty control of the electromagnetic coil 96.

Then, as shown in FIG. 9(A), the transistor 48a of the coil drive circuit 48 is continuously held ON according to the high-level control signal CT (duty ratio: 100%), the battery voltage Vb is continuously applied, and the electromagnetic coil 96 is continuously energized. As a result, the electric motor 60 assumes the unlocked state as shown in FIG. 4(B).

If the predetermined time "t" has elapsed (S208: Yes), the CPU 44a generates a control signal CT for intermittently turning the transistor 48a of the coil drive circuit 48 ON, and outputs the control signal CT to the coil drive circuit 48 via the I/O circuit 44d (S214).

Then, as shown in FIG. 9(B), the transistor 48a of the coil drive circuit 48 is intermittently turned ON according to the control signal CT (duty ratio: 60% or 40%), the battery voltage Vb is intermittently applied, and the electromagnetic coil 96 is subjected to PWM control through intermittent energization. As a result, the electric motor 60 is maintained in the unlocked state as will be described later.

[Operations and Effects of Embodiment]

The embodiment that has been described above in detail makes it possible to achieve the following operations and effects.

(1) In bringing the electric motor 60 into the unlocked state (S202: Yes), the CPU 44a continuously energizes the electromagnetic coil 96 of the lock mechanism 90 during the lapse of the predetermined time "t" regardless of the battery voltage Vb (S210). That is, in bringing the electric motor 60 into the unlocked state, the CPU 44a performs duty control (PWM control) by energizing the electromagnetic coil 96 for the predetermined time "t" at a duty ratio of 100% regardless of the battery voltage Vb.

It is appropriate that a time that is just sufficient for the electric motor 60 to be reliably brought into the unlocked state be found through an experiment, and that the predetermined time "t" be set as the time thus found (e.g., one second).

As shown in FIG. 4(B), reliably bringing the electric motor 60 into the unlocked state means that the lock arm 92 is tilted in such a direction as to move away from the lock holder 99 and that the engaging convex portion 92a of the lock arm 92 and the engaging convex portion 99a of the lock holder 99 are reliably disengaged from each other.

In this manner, the electric motor 60 can be brought into the unlocked state without delay.

(2) After the electric motor 60 has been brought into the unlocked state (S208: Yes), the CPU 44a intermittently energizes the electromagnetic coil 96 of the lock mechanism 90 at a duty ratio corresponding to the battery voltage Vb (S214). That is, once the electric motor 60 has been brought into the unlocked state, the CPU 44a then performs duty control by energizing the magnetic coil 96 at the duty ratio corresponding to the battery voltage Vb.

For example, as shown in FIG. 9(B), the duty ratio is 40% if the battery voltage Vb is equal to or higher than 14V, and the duty ratio is 60% if the battery voltage Vb is equal to or lower than 13V.

In duty control of the electromagnetic coil 96, it is appropriate that a duty ratio that is just sufficient for the electric motor 60 to be maintained in the unlocked state be found through an experiment in coordination with the battery voltage Vb and that the duty ratio thus found be adopted.

As described above, if the electromagnetic coil 96 is energized, a drive force resulting from an electromagnetic force between the electromagnetic coil 96 and the permanent magnet 98 is generated, and the electric motor 60 assumes the unlocked state if the drive force exceeds a pressing/urging force of the torsion coil spring 95.

The drive force that is required for the maintenance of the electric motor 60 in the unlocked state can be smaller than the drive force that is required for a shift of the electric motor 60 from the locked state to the unlocked state.

Thus, after the electric motor 60 has assumed the unlocked state, heat generation from the electromagnetic coil 96 can be suppressed by performing duty control such that the electromagnetic coil 96 is energized at a duty ratio that is just sufficient for the electric motor 60 to be maintained in the unlocked state.

That is, in duty control, since heat that is generated while the electromagnetic coil 96 is energized is discharged while the electromagnetic coil 96 is not energized, heat generation can be suppressed more effectively in comparison with a case where the electromagnetic coil 96 is continuously energized as in the related art.

(3) The drive force increases in proportion to an increase in the battery voltage Vb, whereas the pressing/urging force of the torsion coil spring 95 is constant. To maintain the electric motor 60 in the unlocked state, it is appropriate that the drive force be equal to or larger than the pressing/urging force. Therefore, it is appropriate that the duty ratio be set as a small value if the battery voltage Vb is high.

Thus, by performing duty control such that the electromagnetic coil 96 is energized at a duty ratio corresponding to the battery voltage Vb, it becomes possible to prevent the above-mentioned drive force from becoming excessive in the case where the battery voltage Vb is high, and to inhibit the electromagnetic coil 96 from generating heat corresponding to an excess in the drive force.

For example, it is assumed that the electric motor 60 can be maintained in the unlocked state at a duty ratio of 40% if the battery voltage Vb is equal to or higher than 14V. In this case, if the duty ratio is set as 60% as in the case where the battery voltage Vb is equal to or lower than 13V, the drive force is excessively generated by a value corresponding to a duty ratio of 20%. The electromagnetic coil 96 also generates a surplus amount of heat corresponding to an excess in the drive force.

Hence, in the case where the battery voltage Vb is equal to or higher than 14V, if the electromagnetic coil 96 is energized at a duty ratio of 40% which is just sufficient for the electric motor 60 to be maintained in the unlocked state, generation of an amount of heat corresponding to a duty ratio of 20% from the electromagnetic coil 96 can be suppressed in comparison with the case where the electromagnetic coil 96 is energized at a duty ratio of 60%.

As a result of the above-mentioned operations and effects (2) and (3), the electromagnetic coil 96 can be held at a temperature equal to or lower than 100° C. Thus, it is possible to prevent the operating angle sensors 80 constituted by the Hall IC's from malfunctioning, and to prevent life of the operating angle sensors 80 from being shortened.

Even in the case where various semiconductor devices (e.g., an anti-noise capacitor and a non-return diode connected to a drive signal feed line leading to the electric motor 60, and the like) as well as the operating angle sensors 80 are disposed close to the electromagnetic coil 96, maintaining the electromagnetic coil 96 at a low temperature makes it possible to prevent the semiconductor devices from malfunctioning and to prevent their life from being shortened.

(4) In duty control of the electromagnetic coil 96, if the battery voltage Vb is between 13V and 14V, the duty ratio exhibits a hysteresis characteristic as shown in FIG. 9(B).

That is, the duty ratio is held equal to 60% if the battery voltage Vb has risen from 13V and has not yet become higher than 14V, and the duty ratio is held equal to 40% if the battery voltage Vb has fallen from 14V and has not yet become lower than 13V.

The duty ratio thus exhibits the hysteresis characteristic corresponding to the battery voltage Vb because the solenoid SL needs to be prevented from causing the phenomenon of chattering according to fluctuations in the to battery voltage Vb during a change in energization state of the electromagnetic coil 96 (during a shift from energization to non-energization or vice versa).

That is, if the solenoid SL causes the phenomenon of chattering during a change in energization state of the electromagnetic coil 96, the lock arm 92 repeatedly tilts several times and then stabilizes. Therefore, there is an apprehension that the electric motor 60 will shift from the unlocked state to the locked state.

Thus by making the duty ratio exhibit the hysteresis characteristic corresponding to the battery voltage Vb in duty control of the electromagnetic coil 96, it becomes possible to prevent the solenoid SL from causing the phenomenon of chattering according to fluctuations in the battery voltage Vb, and to stably maintain the electric motor 60 in the unlocked state even during fluctuations in the battery voltage Vb.

[Other Embodiments]

The present invention is not limited to the above-mentioned embodiment and may be embodied as follows. In the following cases as well, it is possible to achieve operations and effects that are equivalent to or more advantageous than those of the above-mentioned embodiment.

[1] In the above-mentioned embodiment, when the electric motor 60 is brought into the unlocked state, the electromagnetic coil 96 is subjected to duty control by being energized at a duty ratio of 100%.

However, in order to bring the electric motor 60 into the unlocked state, it is not required that the electromagnetic coil 96 be energized at a duty ratio of 100%. That is, in order to bring the electric motor 60 into the unlocked state, it is appropriate that a duty ratio that is just sufficient to reliably achieve the unlocked state be found through an experiment in coordination with the battery voltage Vb and that the duty ratio thus found (e.g., approximately 80 to 90%) be adopted.

However, if the electromagnetic coil 96 is energized at a duty ratio of 100%, the electric motor 60 can be brought into the unlocked state without delay.

[2] In the above-mentioned embodiment, when the electric motor 60 is maintained in the unlocked state, the duty ratio is set in a double-staged (40%, 60%) manner in coordination with the battery voltage Vb.

However, the duty ratio may be set in a triple-staged (e.g., 30%, 50%, 70% or the like) or multiple-staged manner in coordination with the battery voltage Vb.

In this case, if the solenoid SL does not cause the phenomenon of chattering, it is not necessary that the duty ratio exhibit the hysteresis characteristic corresponding to the battery voltage Vb.

Further, as shown in FIG. 9(C), the duty ratio may be set in such a manner as to continuously change in coordination with the battery voltage Vb.

Furthermore, as shown in FIG. 9(D), the duty ratio may be linearly changed in coordination with the battery voltage Vb (i.e., the duty ratio may be reduced in proportion to an increase in the battery voltage Vb).

[3] In the above-mentioned embodiment, a PNP transistor is used as the transistor 48a of the coil drive circuit 48.

However, a suitable switching element (e.g., an MOSFET, an SIT, an IGBT, a thyristor, or the like) other than an NPN transistor and a bipolar transistor may be substituted for the transistor 48a.

[4] In the above-mentioned embodiment, the torsion coil spring 95 is used to press and urge the lock arm 92.

However, if the lock arm 92 can be urged toward the lock holder 99, a suitable urging member may be substituted for the torsion coil spring 95.

Examples of such an urging member include a helical extension spring or a helical compression spring that is mounted between the tip portion of the lock arm 92 and the housing 52, various formed wires that are mounted between the tip portion of the lock arm 92 and the housing 52, and the support shaft 94 that is constructed of a torsion bar.

[5] In the above-mentioned embodiment, the input shaft 12 is fixed to the movable flange 74, and the output shaft 14 is fixed to the cover 52a of the housing 52.

However, the input shaft 12 and the output shaft 14 may be interchanged with each other, by fixing the output shaft 14 to the side of the movable flange 74, and by fixing the input shaft 12 to the side of the cover 52a of the housing 52.

[6] In the above-mentioned embodiment, the electromagnetic coil 96 is securely mounted to the lock arm 92, and the permanent magnet 98 is securely mounted to the housing 52.

However, the electromagnetic coil 96 and the permanent magnet 98 may be interchanged with each other, by securely mounting the permanent magnet 98 to the side of the lock arm 92, and by securely mounting the electromagnetic coil 96 to the side of the housing 52.

[7] In the above-mentioned embodiment, the lock mechanism 90 is constructed using the lock arm 92.

However, as disclosed in Japanese Patent Application Laid-Open No. 11-1176, the lock mechanism 90 may be constructed using slide pins instead of the lock arm 92. In this case, it is appropriate that a plurality of pin holes which are arranged at intervals of an equal distance and into which the slide pins are inserted be formed in the lock holder 90 or the rotor 64 of the electric motor 60, that the slide pins that are driven by a solenoid be inserted into the pin holes, and that the electric motor 60 be thereby brought into the locked state.

[8] In the above-mentioned embodiment, when bringing the electric motor 60 into the locked state (S202: No), the CPU 44a continuously stops the electromagnetic coil 96 of the lock mechanism 90 from being energized (S204). That is, when bringing the electric motor 60 into the locked state, the CPU 44a performs duty control by energizing the electromagnetic coil 96 at a duty ratio of 0%.

However, as disclosed in Japanese Patent Application Laid-Open No. 2001-180509, it is also appropriate that duty control (PWM control) be performed by energizing the electromagnetic coil 96 at a duty ratio that is just sufficient for the electric motor 60 to be maintained in the locked state (i.e., a duty ratio that does not allow the electric motor 60 to assume the unlocked state) when bringing the electric motor 60 into the locked state.

It is to be noted herein that the variable transfer-ratio mechanism 50 corresponds to the variable transfer-ratio unit, that the lock mechanism 90, the on-vehicle battery 26, the coil drive circuit 48, and the control processing (S200) of the electromagnetic coil in the CPU 44a correspond to the lock unit, that the lock arm 92 and the lock holder 99 correspond to the stopper member, that the torsion coil spring 95 corresponds to the urging member, that the on-vehicle battery 26, the coil drive circuit 48, and the control processing (S200) of the electromagnetic coil in the CPU 44a correspond to the control unit, that the battery voltage Vb corresponds to the power-supply voltage, that the processing that is performed by the CPU 44a according to the flowcharts shown in FIGS. 6 to 8 correspond to the program, and that the ROM 44b corresponds to the record medium.

What is claimed is:

1. A vehicular steering device comprising:

a variable transfer-ratio unit for changing a transfer ratio between a steering angle of a steering handle and a turning angle of a turning wheel;

an electric motor for driving the variable transfer-ratio unit; and lock unit for making a shift between a locked state in which relative rotation of the electric motor is stopped and an unlocked state in which the electric motor is released, wherein the lock unit comprises a stopper member for stopping relative rotation of the electric motor, an urging member for urging the stopper member such that the stopper member stops the electric motor, a solenoid for releasing the electric motor by driving the stopper member against an urging force of the urging member, and a control unit for controlling a voltage applied to the solenoid, and wherein, after the electric motor has been released and has assumed the unlocked state, the control unit intermittently applies a voltage to the solenoid so as to maintain the electric motor in the unlocked state.

2. The vehicular steering device according to claim 1, wherein when making a shift from the locked state to the unlocked state, the control unit continuously applies a voltage to the solenoid until the electric motor is released.

3. The vehicular steering device according to claim 1 or 2, wherein the control unit changes, in coordination with a power-supply voltage applied to the solenoid, a duty ratio at which the voltage is intermittently applied to the solenoid.

4. The vehicular steering device according to claim 3, wherein the control unit changes the duty ratio in a stepped manner in coordination with the power-supply voltage.

5. The vehicular steering device according to claim 4, wherein when changing the duty ratio in the stepped manner, the control unit makes the duty ratio exhibit a hysteresis characteristic corresponding to the power-supply voltage.

6. The vehicular steering device according to claim 3, wherein the control unit continuously changes the duty ratio in coordination with the power-supply voltage.

7. The vehicular steering device according to claim 6, wherein the control unit linearly changes the duty ratio in coordination with the power-supply voltage.

8. A program for causing a computer system to function as each of the units in the vehicular steering device according to any one of claims 1 to 7.

9. A computer-readable record medium in which a program for causing a computer system to function as each of the units in the vehicular steering device according to any one of claims 1 to 7 is recorded.

* * * * *